(12) United States Patent
Ladouceur

(10) Patent No.: US 7,152,294 B2
(45) Date of Patent: Dec. 26, 2006

(54) SELF-ATTACHING FEMALE FASTENER ELEMENT AND METHOD OF INSTALLATION

(75) Inventor: Harold A. Ladouceur, Livonia, MI (US)

(73) Assignee: Whitesell International Corp., Muscle Shoals, AL (US)

( * ) Notice: Subject to any disclaimer, the term of this patent is extended or adjusted under 35 U.S.C. 154(b) by 287 days.

(21) Appl. No.: 10/691,847

(22) Filed: Oct. 23, 2003

(65) Prior Publication Data
US 2004/0078949 A1 Apr. 29, 2004

Related U.S. Application Data

(60) Provisional application No. 60/420,658, filed on Oct. 23, 2002.

(51) Int. Cl.
*B23P 11/00* (2006.01)

(52) U.S. Cl. .......................... 29/432.1; 29/432; 29/505; 29/509; 29/512; 411/179; 411/180; 411/523; 411/502

(58) Field of Classification Search .............. 29/432.1, 29/525, 505, 509, 512, 432, 432.2; 411/172, 411/173, 176–183, 360–363, 501, 502, 516, 411/520–523; 209/929
See application file for complete search history.

(56) References Cited

U.S. PATENT DOCUMENTS

| 412,243 | A | * | 10/1889 | Dion | .......................... 411/506 |
| 528,711 | A | | 11/1940 | Lorenzo et al. | |
| 3,099,057 | A | * | 7/1963 | Cook | .......................... 24/713.6 |
| 3,446,908 | A | * | 5/1969 | Tally et al. | .................. 174/266 |
| 4,610,072 | A | | 9/1986 | Muller | |
| 4,711,021 | A | | 12/1987 | Muller | |
| 4,810,143 | A | | 3/1989 | Muller | |
| 4,831,698 | A | * | 5/1989 | Muller | .......................... 29/512 |
| 4,911,592 | A | | 3/1990 | Muller | |
| 5,090,854 | A | * | 2/1992 | Hafeli et al. | ................. 411/186 |
| 5,237,733 | A | * | 8/1993 | Ladouceur et al. | ......... 29/432.2 |
| 5,251,370 | A | | 10/1993 | Muller et al. | |
| 5,335,411 | A | | 8/1994 | Muller et al. | |
| 5,423,645 | A | | 6/1995 | Muller et al. | |
| 5,439,336 | A | | 8/1995 | Muller | |
| 5,667,328 | A | * | 9/1997 | Hofle | .......................... 403/282 |
| 6,095,738 | A | | 8/2000 | Selle | |
| 6,272,728 | B1 | * | 8/2001 | Lenac et al. | .................. 29/458 |

FOREIGN PATENT DOCUMENTS

DE 296 10 640 U 1 11/1996

OTHER PUBLICATIONS

PCT/US03/33632 International Search Report.

* cited by examiner

*Primary Examiner*—David P. Bryant
*Assistant Examiner*—Christopher M. Koehler
(74) *Attorney, Agent, or Firm*—Howard & Howard Attorneys, P.C.

(57) ABSTRACT

A symmetrical self-attaching female fastener including a body having a bore, and identical integral tubular barrel portions extending from opposed ends of the body coaxially aligned with the bore. The installation method includes driving either barrel portion through an opening in a panel, which may be formed by piercing the panel with the barrel portion, and simultaneously deforming both barrel portions radially outwardly and inwardly, wherein one barrel portion entraps the panel and the other exposed barrel portion is folded at an acute angle relative to the bore to reduce the overall length of the assembly.

8 Claims, 2 Drawing Sheets

SELF-ATTACHING FEMALE FASTENER ELEMENT AND METHOD OF INSTALLATION

RELATED APPLICATIONS

This application claims priority to U.S. Provisional Application Serial No. 60/420,658 filed Oct. 23, 2002.

FIELD OF THE INVENTION

This invention relates to a symmetrical self-attaching female fastener element having a tubular riveting portion on both longitudinal ends of the fastener body which may be fed to an installation head without orienting the fastener relative to the longitudinal axis and a method of installing such fasteners.

BACKGROUND OF THE INVENTION

Self-attaching female fastener elements, including pierce and clinch nuts, are well known in the art. Such self-attaching female fastener elements may be formed either by rolling techniques, wherein the self-attaching female fastener element is generally rectangular including a rectangular projecting pilot portion and flange portions on opposed sides of the pilot portion, or by cold heading techniques, wherein the female fastener element includes a body portion having a bore therethrough and a tubular barrel portion integral with the body portion having a distal open end and a longitudinal axis coincident with the longitudinal axis of the bore through the body portion. The female fastener elements formed by cold header techniques are sometimes referred to as "round" pierce nuts. U.S. Pat. Nos. 4,610,072 and 4,711,021 assigned to the predecessor in interest of this application disclose round pierce nuts of this type and methods of installation.

During installation of a conventional round pierce nut formed by cold header techniques, the distal open end of the tubular barrel portion is received through an opening in a metal panel and substantially simultaneously deformed radially outwardly and axially into a U-shape in cross section to entrap panel metal surrounding the panel opening to permanently attach the female fastener element to the panel. This type of round pierce nut formed by cold header techniques has been commercially successful in mass production applications used by the automotive and appliance industries.

Pierce and clinch nuts of the types described above are generally installed in a die press, which may also be utilized to simultaneously form the metal panel to which the pierce or clinch nut is attached. An installation head is generally attached to one die platen or shoe of a die press, typically the upper die platen, and a die member or die "button" is attached to the other die platen, typically the lower die platen. As will be understood by those skilled in the art, however, the orientation of the installation head and the die button may be reversed. The installation head typically includes a feed chute which receives the self-attaching fasteners and feeds the self-attaching fasteners to the installation head. The installation head then includes a reciprocating plunger which installs the self-attaching fastener in a panel with each stroke of the die press. Where the self-attaching fastener is a self-attaching round pierce of clinch nut, as described above, the feed chute is typically a cylindrical flexible tube which receives the round self-attaching fasteners from a high speed hopper. However, as will be understood, the round self-attaching fasteners must first be oriented, generally in the hopper, such that the barrel portion is received in the installation head opposite the panel for installation in the panel by the reciprocating plunger. The requirement for orientation of the self-attaching fastener element significantly reduces the feed rate in the hopper and requires orientation equipment.

It would therefore be desirable for self-attaching fasteners formed by cold header techniques to be symmetrical with respect to the feed direction in the longitudinal axis of the fastener to increase the feed rate to the installation head and eliminate orientation equipment. However, assuming that the self-attaching fastener element included, for example, an integral barrel portion projecting from opposed ends of the body portion, such that the self-attaching fastener is symmetrical, eliminating orientation in the hopper, the tubular barrel portion projecting from the panel creates other problems following installation including, but not limited to, the longitudinal length of the fastener following installation in the panel. The self-attaching female fastener element of this invention solves these problems.

SUMMARY OF THE INVENTION

A preferred embodiment of the self-attaching female fastener element of this invention includes a body portion having a bore extending therethrough and first and second tubular barrel portions integral with the opposed ends of the body portion, coaxially aligned with the bore, and each having an open distal end. In one preferred embodiment, the bore is threaded and the tubular barrel portions each include a smooth cylindrical internal surface preferably having an internal diameter, greater than the diameter of the threaded bore and a smooth cylindrical external or outer surface having an outer diameter less than the outer diameter of the body portion. Further, the lengths of the tubular barrel portion are preferably generally equal, such that the self-attaching fastener element is symmetrical with respect to a plane perpendicular to the longitudinal axis of the fastener bore. The opposed open distal ends of the tubular barrel portions each preferably include an internal frustoconical chamfer extending radially outwardly from the smooth internal surface of the tubular barrel portions, thereby permitting the fastener to be utilized either as a pierce or clinch nut. In a preferred embodiment, the body portion includes a generally polygonal external surface, preventing rotation of the female fastener element relative to the panel, following installation.

The female fastener element of this invention may thus be fed to the installation head in either orientation with respect to the longitudinal axis, significantly increasing the feed rate of the female fastener element from a hopper, such as a conventional vibratory hopper, to the feed chute and eliminating orientation of the female fastener element in the hopper or prior to receipt of the female fastener element in a feed chute, such as a conventional flexible plastic tubular feed chute.

The method of installing the female fastener of this invention includes inserting a first of the distal ends of either one of the tubular barrel portions through an opening in the panel and simultaneously deforming the first distal end of the tubular barrel portions radially outwardly to entrap a portion of the panel surrounding the panel opening, permanently retaining the self-attaching female fastener element to the panel, and simultaneously deforming a second of the distal ends of the other of the tubular barrel portions radially outwardly and axially, thereby reducing the longitudinal length of the self-attaching female fastener element, following installation. In a preferred embodiment, the second of the distal ends of the other of the tubular barrel portions, which is exposed following installation, is deformed radially outwardly and inwardly, folding the exposed tubular barrel portion into a tight U-shape extending at an acute angle relative to the longitudinal axis of the body portion, wherein the distal end of the exposed barrel portion is rounded and extends toward the body portion eliminating a sharp edge could damage other components. In this embodiment, the outer portion of the exposed U-shaped barrel portion extends generally parallel to the inner portion and the distal end is adjacent the body portion of the fastener. Where the self-attaching female fastener of this invention is utilized as a pierce nut, the open distal end of one of the tubular barrel portions is driven against the panel and utilized to pierce an opening through the panel as disclosed in U.S. Pat. No. 4,911,952 and a quill may remove the panel slug. The distal end is then received through the panel opening into a die button, which preferably deforms the tubular barrel portion radially and axially, forming a U-shape, securely retaining the fastener element to the panel. Where the body portion includes a polygonal outer surface as described above, the panel portion is simultaneously driven into the polygonal surface, preventing rotation of the female fastener element in the panel, following installation. The chamfered frustoconical surface at the distal end of the tubular barrel portions significantly reduces the force required to deform the distal end of the barrel portion in a die member into the preferred U-shaped configuration at both ends of the body portion.

The self-attaching female fastener element and method of this invention thus eliminates orientation of the female fastener element prior to installation and reduces the longitudinal length of the female fastener element following installation. Other advantages and meritorious features of the self-attaching female fastener element and method of this invention will be more fully understood from the following description of the preferred embodiments, the appended claims and the drawings, a brief description of which follows.

DESCRIPTION OF THE PREFERRED EMBODIMENTS

Figure 1:
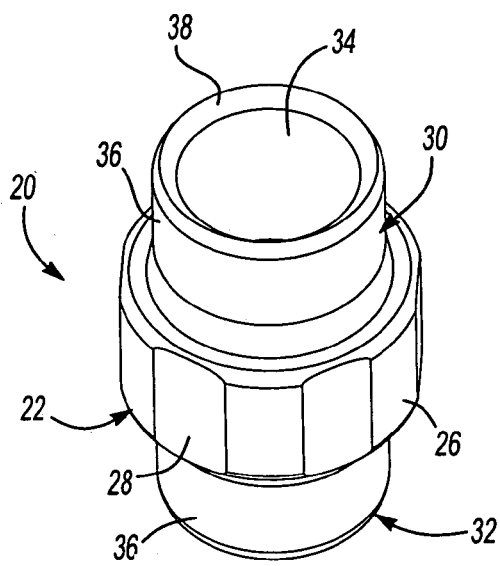
FIG. 1 is a top perspective view of one embodiment of a self-attaching female fastener element of this invention which may be installed in a panel by the method of this invention.

As set forth above, this invention relates to a self-attaching female fastener element which is symmetrical relative to a plane perpendicular to the longitudinal axis of the bore through the female fastener element and a method of installing or attaching a self-attaching female fastener element in a metal panel, wherein the female fastener element includes a body portion and concentric tubular barrel portions, such that the female fastener element is symmetrical and thus either end of the female fastener element may be installed in a panel without orienting the female fastener element prior to installation. Thus, the female fastener element utilized in the method of installation in a panel may take various forms and the self-attaching female fastener element illustrated in the drawings is for illustrative purposes only.

Figure 2:
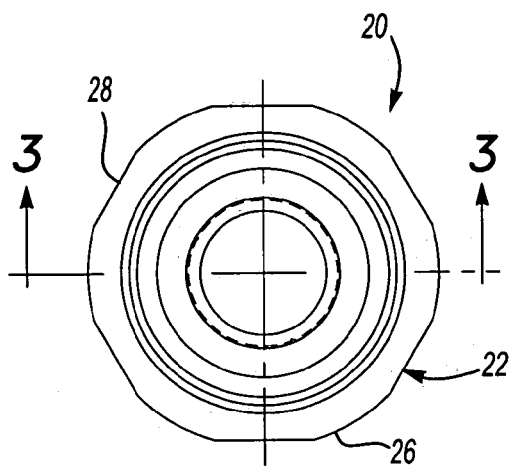
FIG. 2 is a top view of the female fastener element shown in FIG. 1.
Figure 4:
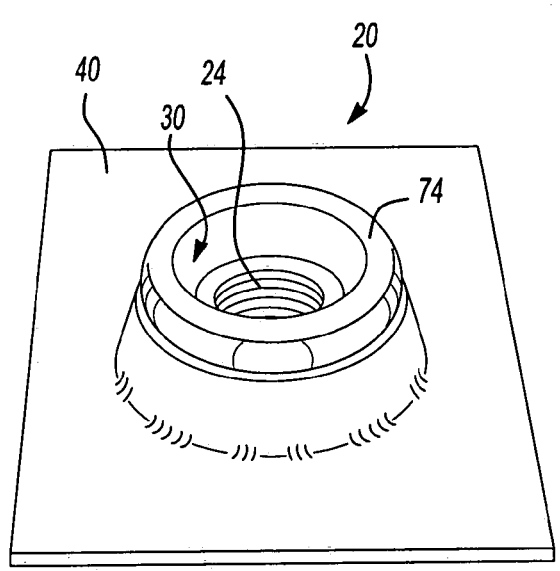
FIG. 4 is a bottom perspective view of a female fastener and panel assembly formed by the method of this invention.
Figure 3:
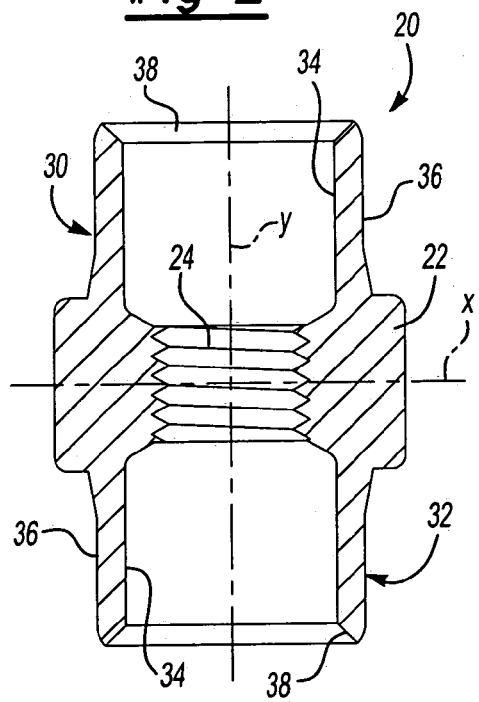
FIG. 3 is a side cross-sectional view of FIG. 2 in the direction of view arrows 3—3.

The female fastener element 20 illustrated in FIGS. 1 to 3 includes a body portion 22 having a threaded bore 24 and external generally planar surfaces which, in the disclosed embodiment, comprise alternating concave and convex surfaces 26 and 28, respectively. The function of the concave and convex surfaces 26 and 28 is to prevent rotation of the female fastener element 20 in a panel following installation and therefore the exterior surface of the body portion may comprise any convenient shape having generally radial surfaces, including the generally cylindrical concave surfaces 26 and the generally convex cylindrical surfaces 28 or the body may be polygonal. The bore 24 through the body portion 22 may also be unthreaded, providing a smooth cylindrical bore for receipt of a thread rolling or thread forming male fastener, such as screw or bolt.

The female fastener element 20 also includes integral symmetrical concentric tubular barrel portions 30 and 32 each having a smooth generally cylindrical internal surface 34, having an internal diameter greater than the internal diameter of the threaded bore 24, and a smooth generally cylindrical external surface 36 having an external diameter less than the major diameter of the body portion 22 as best shown in FIG. 3. The tubular barrel portions 30 and 32 are also concentric with the longitudinal axis "Y" of the bore 24 and symmetrical with respect to an axis or plane "X" perpendicular to the longitudinal axis "Y" of the bore 24 through the center of the body portion 22 as shown in FIG. 3. The female fastener element 20 may thus be fed to a conventional installation head (not shown) through a conventional tubular feed chute having an internal diameter slightly larger than the external diameter of the body portion 22 in either orientation and presented to a panel for installation as described below. Where the female fastener element is utilized as a self-attaching element, the open distal ends of the tubular barrel portions 30 and 32 preferably each include a chamfer 38 as best shown in FIG. 3. Having described one preferred embodiment of a self-attaching female fastener element 20, the method of installation may now be described with reference to FIG. 5.

Figure 5:
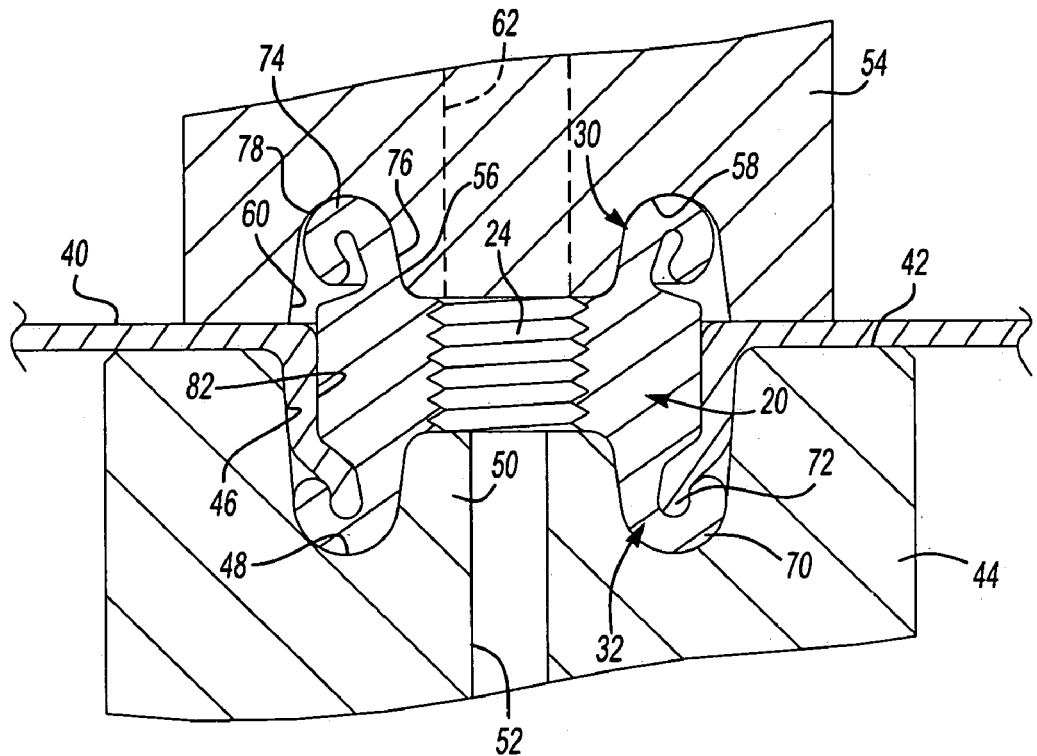
FIG. 5 is a side cross-sectional view illustrating the installation of the female fastener element shown in FIGS. 1 to 3.

FIG. 5 illustrates one method of installing the female fastener element 20 in a panel 40. As shown in FIG. 5, the panel 40 is supported on an annular surface 42 of a die member or die button 44 prior to installation of the self-attaching female fastener element 20. The die button 44 includes a die cavity including a frustoconical outer surface 46, a smooth concave annular lower surface 48 and a central nose portion 50. The die button also includes a central bore 52 for venting.

Self-attaching female fastener elements 20 are then installed in the panel 40 by a reciprocating plunger 54 in an installation head (not shown) which receives the self-attaching female fastener elements 20 and the reciprocating plunger 54 then drives a female fastener element 20 into the panel 40 as described further below. The plunger 54 also includes a die cavity which is similar but not identical to the die cavity in the die button 44 for receipt of a quill (not shown) as described in the above-referenced U.S. Pat. No. 4,911,952 to remove the slug. That is, the annular die cavity surrounds a central nose portion 56 and includes a cavity die surface 58 and a frustoconical outer surface 60. The plunger may optionally include a central bore 62 which is coaxially aligned with the bore 52 in the die button 44. Where the panel 40 includes a preformed opening, the chamfered surface 38 at the distal open end of one of the tubular barrel portions 30 or 32 is initially received against the panel surrounding the preformed opening and the chamfered surface 38 then drives the panel into the die cavity until the chamfered surface engages the concave annular lower die surface 48 which deforms the distal open end radially outwardly into a U-shape as shown at 70 in FIG. 5. The panel portion 72 surrounding the preformed opening is simultaneously driven into the U-shaped end portion 70 of the tubular barrel portion 32 securely retaining the panel portion 72. The chamfered surface 38 of the opposite tubular barrel portion 30 is simultaneously deformed into a U-shape 74 by the concave die surface 58 which receives the chamfered surface 38. The optional bore 62 may receive a quill (not shown) to pierce the panel as disclosed, for example, in U.S. Pat. No. 4,610,072 assigned to the predecessor in interest of the assignee of this application, the disclosure of which is incorporated herein by reference. As will be understood by those skilled in this art and as shown in U.S. Pat. No. 4,610,072, where the barrel portion 32 pierces the opening in the panel 40, a circular panel slug (not shown) is pierced from the panel and the opening 52 through the die button 44 will be large enough to accept the pierced panel slug.

Figure 6:
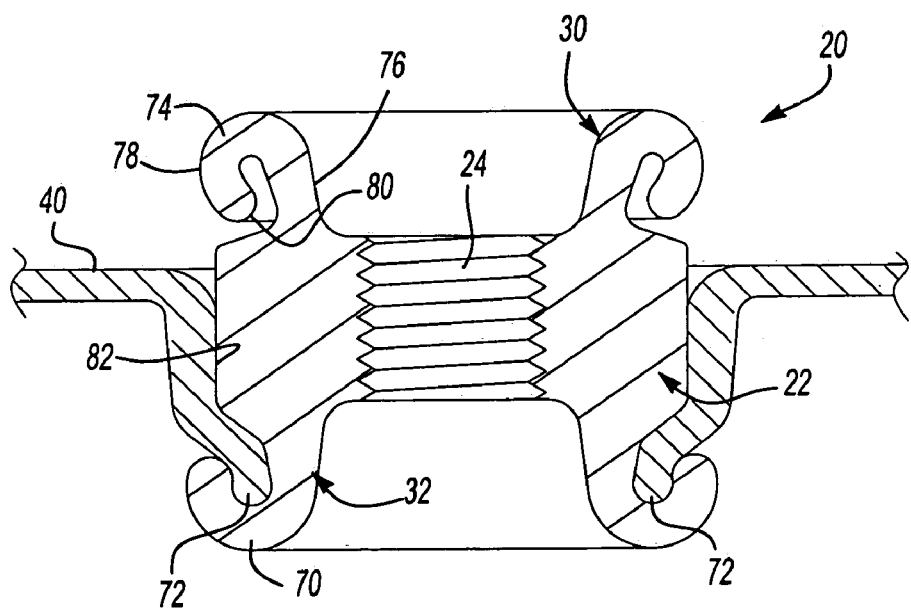
FIG. 6 is a side cross-sectional view of the female fastener element and panel assembly shown in FIG. 5.

FIG. 6 illustrates the resultant female fastener element 20 and panel assembly, wherein the female fastener element 20 has been permanently installed in the panel 40. As shown in FIG. 6, the tubular barrel portion 32 which is received in the die cavity of the die button 44 is deformed radially outwardly into a U-shape 70 to securely retain the panel portion 72 and permanently attach the self-attaching female fastener element 22 to the panel 40. The opposite concentric tubular panel portion 30 is simultaneously deformed into a U-shape 74 reducing the overall height of the female fastener element and panel assembly. In a preferred embodiment of the installation tooling, the frustoconical surface 56 of the plunger 54 deforms the inner surface 34 (FIG. 3) of the tubular barrel portion 30 radially outwardly at an acute angle relative to the longitudinal axis "Y" of the bore 24, such that the inner portion 76 of the U-shaped tubular barrel portion 74 as shown in FIG. 6 extends at an acute angle relative to the longitudinal axis of the bore. Further, the concave die surface 58 of the plunger 54 and the frustoconical outer surface 60 folds the outer portion 78 inwardly, substantially parallel to the inner portion 76 as shown in FIG. 6. Further, the distal end 80 of the tubular barrel portion 74 is rounded in the concave die surface 58 of the plunger 54 and located adjacent the body portion 22 eliminating a sharp edge which could damage other components following installation. Another feature of this embodiment of the method of installing the self-attaching fastener 20 in a panel 40 is that the frustoconical outer surface 46 of the die button 44 has a length greater than the longitudinal length of the body portion 20, such that the tubular panel portion 82 is driven against the outer surface of the body portion which, as shown in FIGS. 1 and 2 include concave and convex surfaces 28 and 26, respectively, preventing rotation of the fastener element 20 relative to the panel 40 following installation, particularly during threading of a bolt, stud or other male fastener element in the threaded bore 24.

Thus, the panel 40 following installation includes a tubular portion 82 deformed against the outer surface of the body 22 which is further deformed radially inwardly at 72 into the U-shaped portion 70 of the tubular barrel portion 32 as shown in FIG. 6. A second component (not shown) may then be secured to the panel 40 by threadably receiving a male fastener element (not shown) in the threaded opening 24. However, because the female fastener element 20 is symmetrical with respect to the longitudinal and transverse axes Y and X, respectively, either tubular barrel portion 30 or 32 could have been fed into the die button 44 by the plunger 54 as described above. The method of this invention thus eliminates the requirement for orientation of the female fastener element 20 in the feed system of the installation apparatus. As set forth above, the self-attaching fasteners are normally fed from a high speed feed bowl into a flexible tubular feed chute having an internal diameter slightly greater than the external diameter of the body portion 22, thereby eliminating the requirement for an orientation mechanism and increasing the feed rate.

As set forth above, the female fastener element can have various shapes, such as a polygonal external surface of any suitable configuration. The self-attaching female fastener element may be utilized either as a self-piercing fastener element or a self-clinching fastener element wherein the panel is prepierced as shown in FIG. 5.

The invention claimed is:

1. A method of installing a self-attaching female fastener element in a metal panel, comprising the following steps:
    forming a self-attaching female fastener element including a body portion having a threaded bore therethrough, a first tubular barrel portion integral with a first end of said body portion and a second tubular barrel portion integral with a second end of said body portion, each of said tubular barrel portions having a longitudinal axis coincident with a longitudinal axis of said bare and an outer diameter less than said body portion, such that said self-attaching female fastener element is symmetrical with respect to a plane perpendicular to said longitudinal axis, said method comprising the following steps:
    inserting a distal open end of one of said first and second tubular barrel portions through an opening in said panel and performing the following steps substantially simultaneously,
    deforming said one of said first and second tubular barrel portions radially outwardly and inwardly to entrap an end portion of said panel surrounding said opening, permanently retaining said self-attaching female fastener to said panel; and
    deforming the other of said first and second tubular barrel portions radially outwardly and inwardly by folding an outer distal portion over an inner distal portion having a distal end adjacent said body portion, thereby reducing the longitudinal length of said self-attaching female fastener installed in said panel.

2. The method of installing a self-attaching female fastener element as defined in claim 1, wherein said body portion includes a generally polygonal outer surface, said method including driving said body portion into said panel, deforming a tubular panel portion adjacent said end portion against said generally polygonal outer surface of said body portion, thereby preventing rotation of said self-attaching female fastener relative to said panel.

3. The method of installing a self-attaching female fastener element as defined in claim 1, wherein said method includes driving said distal open end of said one of said first and second tubular barrel portions against said panel, and piercing said opening in said panel.

4. The method of installing a self-attaching female fastener element as defined in claim 1, wherein said method includes deforming said inner tubular barrel portion at an acute angle relative to an axis of said bore and folding said outer tubular distal barrel portion generally parallel to said inner tubular barrel portion.

5. A method of installing a self-attaching female fastener element in a metal panel, comprising the following steps:

forming a self-attaching female fastener including a body portion having a threaded bore therethrough, and tubular barrel portions integral with opposed ends of said body portion, each of said tubular barrel portions having an outer diameter less than an outer diameter of said body portion, a longitudinal axis coincident with a longitudinal axis of said threaded bore, an open distal end and an equal longitudinal length, such that said self-attaching fastener element is symmetrical with respect to a plane perpendicular to said longitudinal axis, said method comprising the following steps:

driving a first of said distal open ends of either of said tubular barrel portions against said panel and piercing an opening in said panel, and driving said first of said distal open ends through said panel opening;

driving said body portion against said panel surrounding said opening, deforming said panel into a tubular portion surrounding said body portion having an open distal end and a second of said tubular barrel portions extending through said open distal end of said tubular portion of said panel;

deforming said first of said distal open ends radially outwardly and inwardly to entrap said open distal end of said tubular portion of said panel, permanently retaining said self-attaching female fastener element to said panel; and deforming a second of said distal open ends of said tubular barrel portions spaced above a plane of said panel radially outwardly and inwardly toward said body portion to reduce the longitudinal length of said female fastener element installed in said panel.

6. The method of installing a self-attaching female fastener element as defined in claim 4, wherein said body portion includes a generally polygonal outer surface, said method including deforming said tubular portion of said panel radially inwardly against said generally polygonal outer surface of said body portion, thereby preventing rotation of said self-attaching female fastener element relative to said panel.

7. The method of installing a self-attaching female fastener element as defined in claim 5, wherein said method includes deforming said other of said tubular barrel portions radially outwardly and inwardly by folding an outer tubular distal barrel portion over an inner tubular barrel portion generally parallel thereto with said distal open end adjacent said body portion.

8. The method of installing a self-attaching female fastener element as defined in claim 7, wherein said method includes deforming said inner tubular barrel portion at an acute angle relative to an axis of said threaded bore.

* * * * *

UNITED STATES PATENT AND TRADEMARK OFFICE
CERTIFICATE OF CORRECTION

PATENT NO. : 7,152,294 B2  
APPLICATION NO. : 10/691847  
DATED : December 26, 2006  
INVENTOR(S) : Harold A. Ladouceur Page 1 of 1

It is certified that error appears in the above-identified patent and that said Letters Patent is hereby corrected as shown below:

Column 6, line 34, please delete "bare" and insert --bore--.

Column 8, line 22, please delete "tabular" and insert --tubular--.

Signed and Sealed this

Eighteenth Day of March, 2008

JON W. DUDAS  
*Director of the United States Patent and Trademark Office*